US009811812B2

(12) United States Patent
Derasmo et al.

(10) Patent No.: US 9,811,812 B2
(45) Date of Patent: Nov. 7, 2017

(54) VEHICULAR VIOLATION FINE PAYMENT USING PORTABLE COMPUTING DEVICE

(71) Applicant: CONDUENT BUSINESS SERVICES, LLC, Dallas, TX (US)

(72) Inventors: Anthony Derasmo, New City, NY (US); Arvind Sriram, Mount Kisco, NY (US); John L. Golzio, Carmel, NY (US)

(73) Assignee: Conduent Business Services, LLC, Dallas, TX (US)

( * ) Notice: Subject to any disclaimer, the term of this patent is extended or adjusted under 35 U.S.C. 154(b) by 399 days.

(21) Appl. No.: 14/535,521

(22) Filed: Nov. 7, 2014

(65) Prior Publication Data
US 2016/0132845 A1 May 12, 2016

(51) Int. Cl.
G06Q 40/00 (2012.01)
G06Q 20/10 (2012.01)
G06Q 20/32 (2012.01)
G07B 15/00 (2011.01)

(52) U.S. Cl.
CPC ....... G06Q 20/102 (2013.01); G06Q 20/3276 (2013.01); G07B 15/00 (2013.01)

(58) Field of Classification Search
CPC ........ G06Q 10/00; G06Q 20/00; G06Q 30/00; G06Q 40/00
USPC ....................................... 705/3–44
See application file for complete search history.

(56) References Cited

U.S. PATENT DOCUMENTS

| 7,391,339 | B2* | 6/2008 | Howard | G06Q 30/0284 340/932.2 |
| 7,826,923 | B2* | 11/2010 | Walker | G06Q 20/20 700/236 |
| 7,950,570 | B2* | 5/2011 | Marchasin | B60R 25/093 194/900 |
| 8,274,403 | B2* | 9/2012 | Groft | G06Q 30/0284 340/539.1 |

(Continued)

FOREIGN PATENT DOCUMENTS

| DE | 102012005952 | 9/2013 |
| WO | 2011149236 | 12/2011 |
| WO | 2012109753 | 8/2012 |

OTHER PUBLICATIONS www.ticketzen.com, "Ticketzen", pp. 1-36, Nov. 6, 2014.

Primary Examiner — Frantzy Poinvil
(74) Attorney, Agent, or Firm — Gibb & Riley, LLC

(57) ABSTRACT

Methods and systems read a computer readable code on a printed vehicular violation using an optical sensor of a portable computing device and access a vehicular violation database to identify a registered vehicle corresponding to data in the computer readable code. The methods and systems retrieve a vehicular violation history for the registered vehicle. The vehicular violation history is a history of vehicular violations maintained by the vehicular violation database related to the registered vehicle, and includes a payment status of fines associated with the vehicular violations. The methods and systems therefore display this vehicular violation history and display an option to pay one or more of the fines on the graphic user interface. The methods and systems then receive payment information into the graphic user interface, and process the payment of one or more of the fines through the portable computing device, using the payment information provided.

20 Claims, 10 Drawing Sheets

(56) References Cited

U.S. PATENT DOCUMENTS

| | | | |
|---|---|---|---|
| 8,688,592 B1 | 4/2014 | Abramson et al. | |
| 2003/0171985 A1* | 9/2003 | Prabhu | G06Q 30/02 |
| | | | 705/14.61 |
| 2013/0073347 A1* | 3/2013 | Bogaard | G06Q 40/02 |
| | | | 705/13 |
| 2013/0159070 A1 | 6/2013 | Salamone | |
| 2015/0058210 A1* | 2/2015 | Johnson, II | G06Q 20/102 |
| | | | 705/40 |
| 2015/0294431 A1* | 10/2015 | Fiorucci | G06Q 50/26 |
| | | | 705/13 |

* cited by examiner

VEHICULAR VIOLATION FINE PAYMENT USING PORTABLE COMPUTING DEVICE

BACKGROUND

Systems and methods herein generally relate to payment systems for vehicle violation fines, and more particularly to payment systems using mobile devices.

There are many methods for enabling the public to pay parking tickets, traffic tickets, and other vehicular violations, including walk-in payment centers, web payment sites, phone, and mail. With mobile devices becoming more prevalent in culture and society, the public can be supplied with easier ways of paying for these vehicular violations. People are using their mobile devices sometimes more than they use their work or home computers for everyday interactions with banks, insurance companies, and social media. People want their mobile devices to make their lives easier and less complicated, and they expect not only commercial enterprises to leverage mobile technology, but their government as well.

SUMMARY

Various exemplary methods herein read a computer readable code (e.g., a barcode, a glyph, a quick reference (QR) code, etc.) on a printed vehicular violation (e.g., parking ticket) using an optical sensor of a portable computing device (e.g., using a camera device of a portable computer, a tablet, a smart phone, etc.). With this, the methods herein can access a vehicular violation database to identify a registered vehicle corresponding to data in the computer readable code.

To help locate the correct vehicular violation database, the methods herein can receive a geographic location corresponding to where the printed vehicular violation was obtained by providing an input field for the geographic location on the graphic user interface of the portable computing device. This allows the methods herein to correctly access the vehicular violation database that is associated with the geographic location. In some instances, the user can be assisted by the methods herein providing a current location on the graphic user interface (based on a global positioning system (GPS) device of the portable computing device) if the user is still in the locale where the violation was issued when they desire to pay the fine.

To maintain privacy rights, the methods herein can confirm the right to access data in the vehicular violation database by requesting and receiving data of the registered vehicle that would not be provided on the printed vehicular violation (e.g., through an input field on a graphic user interface of the portable computing device). Such data that is normally not provided on the printed vehicular violation can include the name of the owner of the registered vehicle, the owner's address, etc. Upon confirming the right to access the vehicular violation database by having the user provide information that is in addition to that information provided on the printed vehicular violation, the methods herein retrieve a vehicular violation history for the registered vehicle (using the portable computing device).

The vehicular violation history is a history of some or all (e.g., the most recent) vehicular violations maintained by the vehicular violation database related to the registered vehicle, and includes a payment status of fines associated with the vehicular violations. The methods herein therefore display this vehicular violation history and display an option to pay one or more of the fines on the graphic user interface. The methods herein then receive payment information into the graphic user interface (for payment of one or more of the fines) and process the payment of one or more of the fines through the portable computing device, using the payment information provided.

If the user does not wish to immediately pay any fines due, the methods herein can display an option on the graphic user interface to set a reminder to pay one or more of the fines at a future time and date, and an option to reset the trial date. If the reminder option is chosen, these methods display an alert on the graphic user interface at the time and date corresponding to the reminder, and the alert provides an option to immediately perform the payment processing, to allow the user to jump directly to the payment screen for ultimate user convenience.

Various systems herein include, among other components, a server application operating on a computerized device that maintains a vehicular violation database, and a remote application in communication with the server application and operating on a portable computing device (that is operatively (meaning directly or indirectly) connected to the computerized device over a network).

The remote application causes an optical sensor of the portable computing device to read a computer readable code on a printed vehicular violation. The server application accesses a vehicular violation database to identify a registered vehicle corresponding to data in the computer readable code. To help locate the correct vehicular violation database, the remote application can cause the portable computing device to obtain a geographic location corresponding to where the printed vehicular violation was obtained by providing an input field for the geographic location on the graphic user interface of the portable computing device. This allows the remote application to correctly access the vehicular violation database that is associated with the geographic location. In some instances, the user can be assisted by the remote application causing the portable computing device to provide a current location on the graphic user interface (based on a global positioning system (GPS) device of the portable computing device) if the user is still in the locale where the violation was issued when they desire to pay the fine.

To maintain privacy rights, the remote application can confirm the right to access data in the vehicular violation database by having the remote application cause the portable computing device to request and receive data of the registered vehicle that would not be provided on the printed vehicular violation (e.g., through an input field on a graphic user interface of the portable computing device). Such data that is normally not provided on the printed vehicular violation can include the name of the owner of the registered vehicle, the owner's address, etc. Upon confirming the right to access the vehicular violation database by having the user provide information that is in addition to information provided on the printed vehicular violation, the server application retrieves a vehicular violation history for the registered vehicle.

The vehicular violation history is a history of some or all vehicular violations maintained by the vehicular violation database related to the registered vehicle, and includes a payment status of fines associated with the vehicular violations. The remote application causes the graphic user interface of the portable computing device to display the vehicular violation history and display an option to pay one or more of the fines. The remote application receives payment information through the graphic user interface for payment of one or more of the fines. The server application processes the payment of one or more of the fines using the payment information.

Again, the remote application can cause the graphic user interface to display an option to set a reminder to pay one or more of the fines at a future time and date, and an option to reset the trial date. If a reminder is set, the remote application then causes the graphic user interface to display an alert at the time and date corresponding to the reminder. This alert provides an option to perform the processing the payment on the graphic user interface.

These and other features are described in, or are apparent from. The following detailed description.

BRIEF DESCRIPTION OF THE DRAWINGS

Various exemplary systems and methods are described in detail below, with reference to the attached drawing figures, in which.

DETAILED DESCRIPTION

Figure 1:
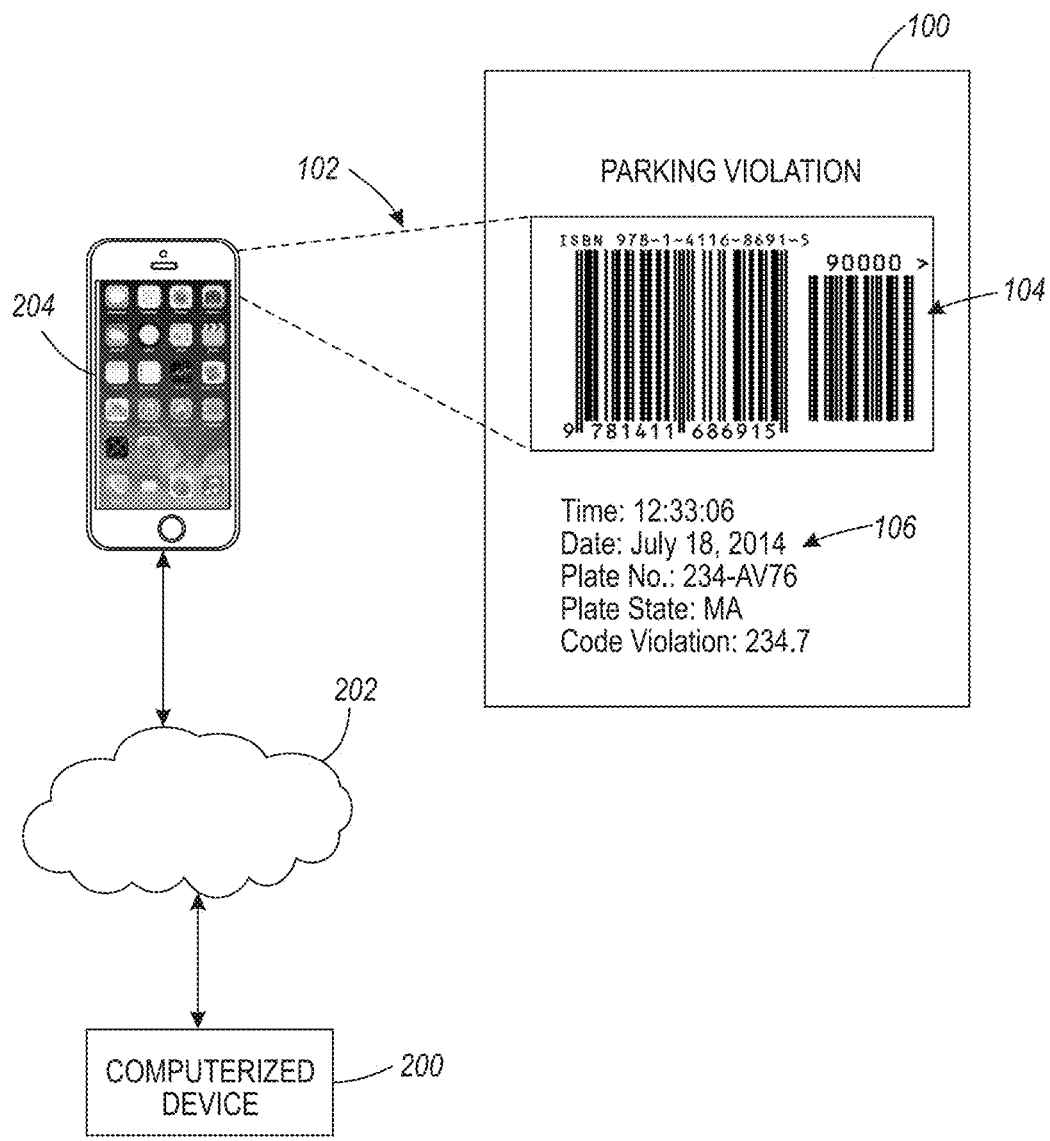
FIG. 1 is a schematic diagram illustrating systems herein.

As mentioned above, the public can be supplied with easier ways of paying for vehicular violations. Therefore, the systems and methods herein provide a mobile smart phone application that enables the public to either manually enter in a ticket number or scan a bar code on any ticket they receive. The public can also pick their preferred city in which they received the ticket. Therefore, if a user lives in Cambridge, Mass. but, receives a ticket is in Boston, Mass., the user can pick Boston as the city they received the ticket in. Once a user has entered a ticket number and preferred city, the application queries a host that processes the violation via secure web services, presents the user with a brief description of the violation, and then guides them to the payment screen and process the payment.

As shown in the drawings discussed in detail below, the user can be presented with a number of screens. One such screen can request the user to scan or enter a ticket number. Here, the user has the ability to manually enter their ticket number or press the "scan" button to scan the barcoded ticket number directly from the ticket. Once all the necessary fields are completed, the user can advance to the inquiry screen. If the ticket the user entered is not yet available in the system, the user can be presented with a reminder to check later and a list of historic violations. The user has the ability to modify the list and delete any tickets that are no longer relevant. Users also have the ability to configure and set their notification preferences. If everything is satisfactory, the user presses the "pay" button, which takes them to the next scene for billing information.

The billing information screen can initially look for user defaults previously saved and provide input fields for additional information. This screen is used to capture the user's basic information (first name, last name, billing zip, and email) that will be used as part of the payment process. A credit card information screen prompts the user for basic pieces of card data: card expiration date, credit card number, and the CVV2 code. In the process payment screen the user is presented with a confirmation scene and asked to verify that all the information displayed is correct.

If the user acknowledges that all the information is correct, they can finalize their payment transaction by touching the "pay" button. The "pay" button commits the payment and also authorizes and settles the credit card transaction via a secure gateway service. When the payment is confirmed, the user is presented with a message notifying them that the payment was either successful or failed.

Figure 12:
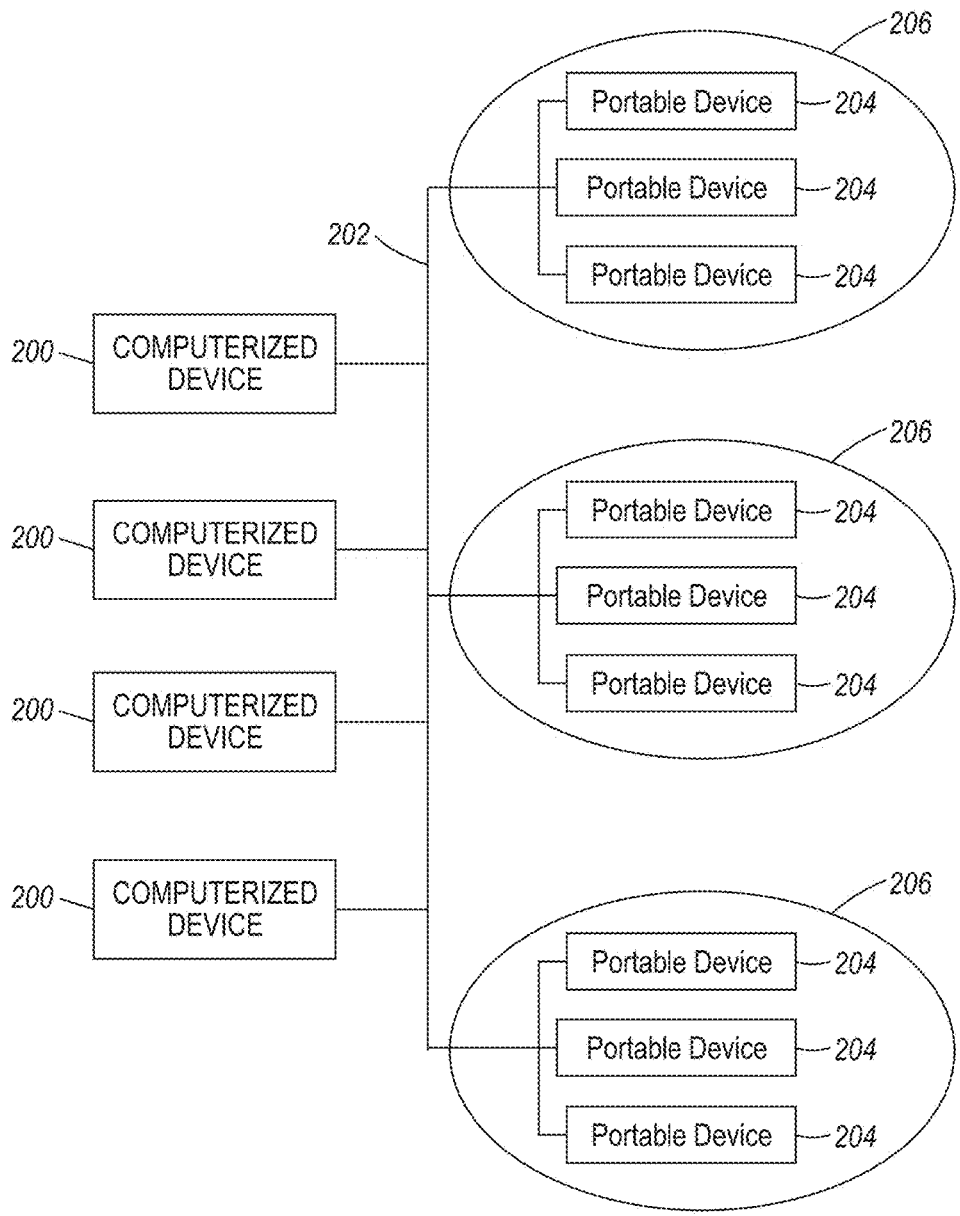
FIG. 12 is a schematic diagram illustrating systems herein.
Figure 13:
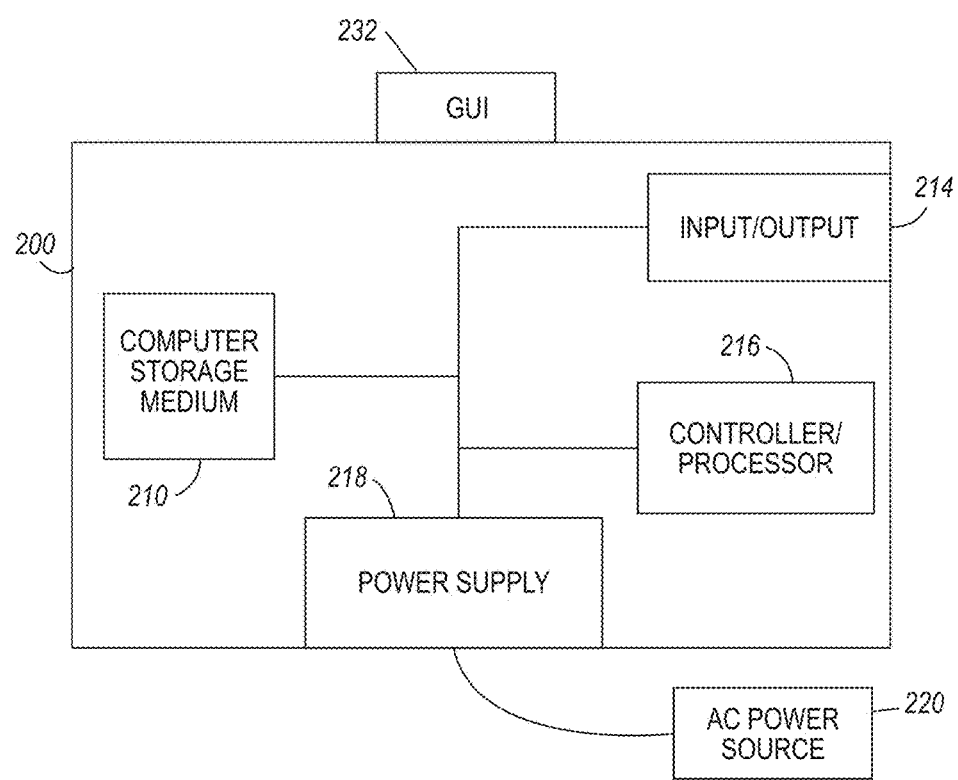
FIG. 13 is a schematic diagram illustrating devices herein.
Figure 14:
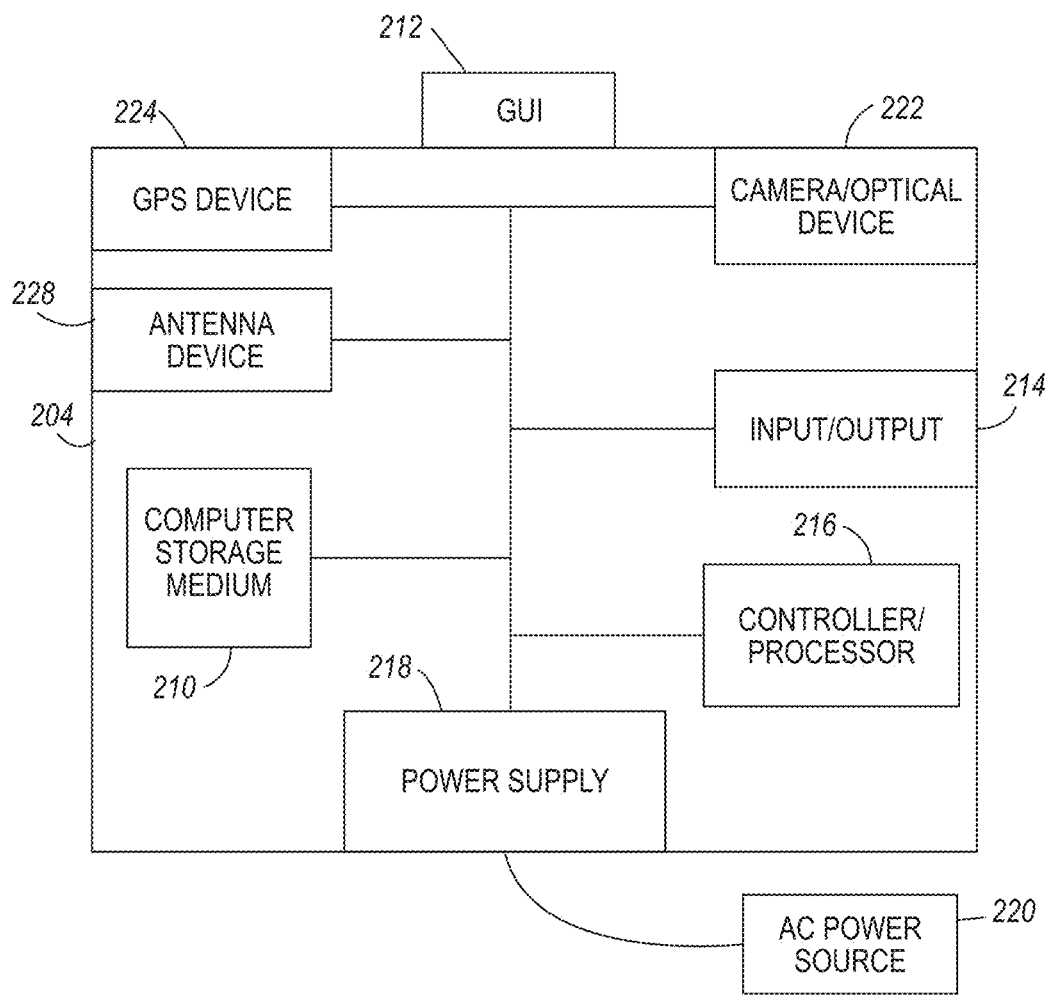
FIG. 14 is a schematic diagram illustrating devices herein.

FIG. 1 illustrates one example of systems provided herein. These systems can include various computerized devices that can be in communication with one another (operatively connected to one another) through any form of network 202, such as a wide area network (WAN) or a local area network (LAN) that can be public or private. In this example, the computerized device 200 is presented as a computerized server that maintains a database and an application that can communicate with a corresponding application on a mobile computerized device 204 (although those ordinarily skilled in the art would understand that many other configurations including more and less components could be utilized by the methods and systems herein). The various sets of instructions that are executed by a computerized processor to perform the methods described herein can be any form of computerized application, such as a smart phone app, a platform application programming interface (API) workflow program, a specialty application, etc., all of which are referred to herein simply as "application" for shorthand. More details of such devices 200, 204 are shown in FIGS. 12-14, which are discussed in detail below.

As shown in FIG. 1, a printed parking violation ticket 100 (which may include some handwritten portions) includes a computer-readable code, which can be any form of computer-readable information weather currently known or developed in the future (e.g., barcode, glyph, QR code, etc.), and human readable information 106 that indicates the nature of the violation (time, date, license plate number, license plate state, legal code section violation, etc.). In operation, the user places the optical sensor of the portable computerized device 204 (camera, scanner, or other computer-readable element) in a position to optically read or scan the computer-readable code 104 as shown by item 102 in FIG. 1.

The application operating on the portable device 204 (which is generically referred to as the "remote application" for ease of nomenclature) is started in some manner (e.g., either started manually by the user, runs in the background and automatically recognizes the computer readable code, is manually instructed by the user through menu options to recognize the computer readable code, or is otherwise brought to an active status) to display one or more of the screens on the graphic user interface 212 of the portable computing device 204 (shown in FIGS. 2-9) to allow the user to pay the fine associated with the violation using the mobile device 204.

Figure 2:
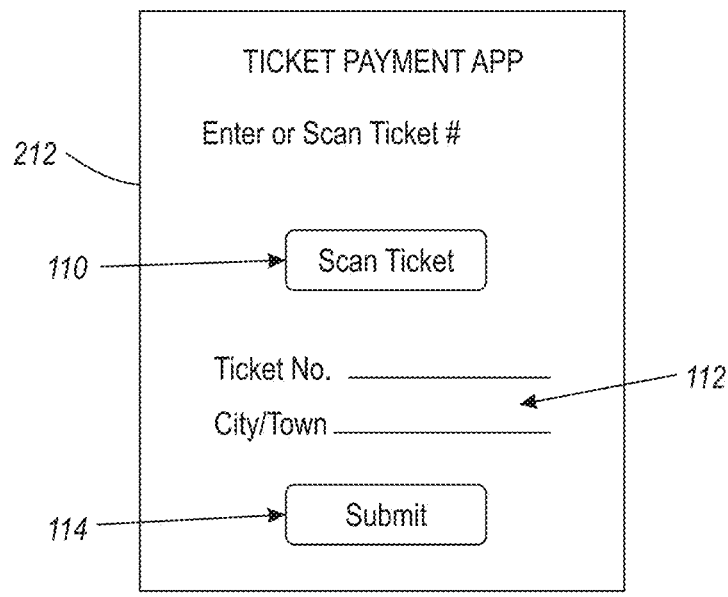
FIG. 2 is a schematic diagram of a screen provided on a graphic user interface using methods and systems herein.

More specifically, as shown in FIG. 2, the graphic user interface 212 can display an option button 110 to scan the computer-readable code 104, and such a screen can optionally include fields 112 that the user can manually complete (note that the option buttons described herein can be any form of selection item, such as a radio button on a touch-screen graphic user interface, hard buttons on a device, etc.). Thus, if the computer readable code 104 does not identify the city or town (or other governmental agency) that issued the printed violation 100, the user can manually enter that information. Similarly, if the portable computing device 204 does not have the ability to properly scan the computer readable code 104 (because of camera device incapability, camera device damage, mutilation of the printed violation 100, missing computer readable code, etc.) the user can manually enter the human-readable portion of the code printed on the printed violation 100.

Regardless of how the ticket number is obtained by the portable computing device 204, when the user selects (note that any form of selection can be utilized with the graphic user interfaces described herein, such as using a finger tap, selecting with a stylist, moving a cursor over the button, etc.) the submit button 114, the remote application contacts the corresponding application running on the server computerized device 200 (which is generically referred to as the "server application" for ease of nomenclature) and transmits the ticket number and jurisdiction to the server application.

The server application then accesses the appropriate database (such as a parking violation database) from a large number of possible databases to obtain the specific information of the violation corresponding to the printed violation ticket 100. The server application could then immediately transfer the specific violation information to the remote application; however, because the printed violation ticket 100 is often left in a publicly viewable area (on a vehicle windshield, on a door, etc.) the methods and systems herein can perform processes to ensure that only the recipient of the violation can access the details of violation. Therefore, in one example shown in FIG. 3, the remote application can, as an authorization procedure, make a request for information that is not contained on the printed violation ticket 100, such as the request 120 shown in FIG. 3 that requests the address of the owner of the vehicle be submitted through an input field 122 and submit button 124. The information provided to gain access to the database information is generally readily available to the vehicle operator, while not being readily available to the public, and is not included on the printed violation ticket 100.

Figure 3:
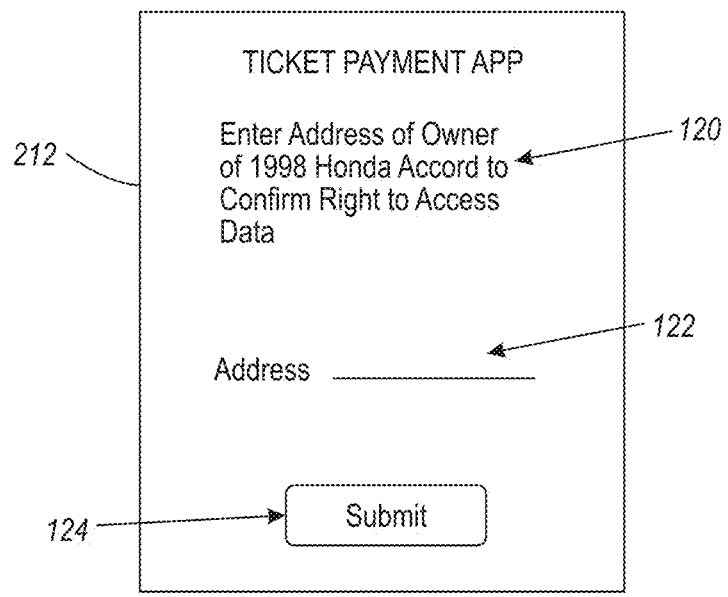
FIG. 3 is a schematic diagram of a screen provided on a graphic user interface using methods and systems herein.

While address information is shown as an example in FIG. 3, those ordinarily skilled in the art would understand that any non-ticket information could be utilized to verify that only the appropriate party (e.g., the party ultimately responsible for the violation) is accessing information within the database (such as vehicle owner's name, address, a previously established security code, etc.). Further, the methods and systems herein present authorization questions that request information that is well-known, or easily available to the vehicle operator, for example, merely by unlocking the vehicle and searching the vehicle interior (e.g. glovebox, etc.) for the corresponding information.

Figure 4:
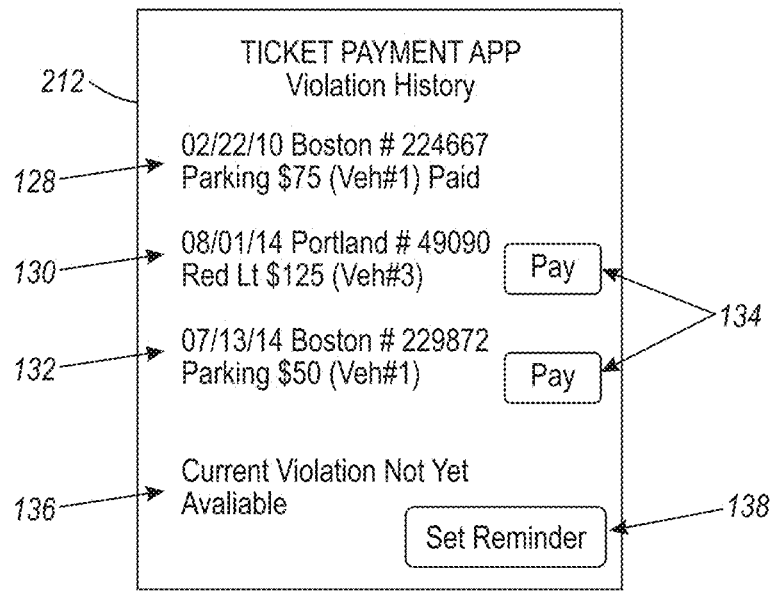
FIG. 4 is a schematic diagram of a screen provided on a graphic user interface using methods and systems herein.

Whether the access authorization procedure is utilized or not, as shown in FIG. 4, the remote application displays details of the current violation, and can display a history of previous violations (of potentially multiple vehicles). As discussed below with respect to FIG. 8, when optionally registering with the remote application, the user may desire that the application provide violation data on multiple vehicles that the user may own or be responsible for (e.g., Veh. #1, Veh. #2, etc.). Therefore, as shown in FIG. 4, the violation history screen provided on the graphic user interface 212 can include a first violation 128 (that occurred on Feb. 22, 2010 in Boston, having violation number 224667 for improper parking, with a fee of $75 relating to user's vehicle number 1, that has been previously paid); a second violation 130 (that occurred on Aug. 1, 2014 in Portland, having violation number 49090 for red light violation, with a fee of $125 relating to user's vehicle number 3, that has not been paid); and a third violation 132, (that occurred on Jul. 13, 2014 in Boston, having violation number 229872 for improper parking, with a fee of $50 relating to vehicle number 1, that also has not been paid). While the screen size of the graphic user interface 212 may limit the number of historical violations that can be displayed in a single time, the user can scroll down or flip through multiple pages to view additional historical violation items.

Therefore, as shown in FIG. 4, once the vehicle associated with the violation is identified (e.g., through the license plate number/state provided on the printed ticket violation 100) by the server application, the server application can retrieve a history of some or all violations that have been associated with that vehicle (and with additional vehicles, if the user has so specified with the remote application) and provide those histories to the remote application for display to the user. This allows the user to be reminded that certain outstanding violations still need to be paid, which may actually make the user aware of violations that they were not previously aware of, providing the user with substantial benefits of cost savings, reduced penalties, etc. Further, by allowing the user to have the remote application (in conjunction with the server application) check on multiple vehicles simultaneously, the user can be informed/reminded of vehicles for which they may be responsible, but to which they have infrequent contact (e.g., children's vehicles, employee's vehicles, etc.).

Also, the violation history shown in FIG. 4 can be provided upon manual request from the user selecting a menu option to display the violation history, or depending upon user preferences can be automatically provided on a periodic schedule (weekly, monthly, quarterly, etc.) as initiated by the remote application, through push notifications any time any of the user's vehicles experience a new violation (as monitored by the server application monitoring the various databases), or any other automated notification process/system. Therefore, the violation history shown in FIG. 4 is not limited only to situations where a new violation ticket has been scanned, but is more broadly applicable as a general monitoring app for multiple vehicles for which the user may have some form of responsibility.

Further, the user of the portable computing device 204 can set user preferences within the remote application regarding how many violations will be displayed in the violation history. For example, the user may desire to see only the most recent 10 violations, to see only the violations within the last year, to see only the violations that remain unpaid, etc., and such preferences of the user can be maintained by the remote application to control how much history is displayed in the violation history shown in FIG. 4 (as set, for example, in FIG. 8, discussed below).

Many times there may be a time lag between when the municipal officer (e.g. parking enforcement officer) issues a violation and when the violation becomes available for access within the database, which prevents the remote application from displaying details of a violation represented by the printed violation ticket 100. In such situations, the methods and systems herein can provide a message to the user on the graphic user interface 212 of the portable computing device 204 that the current violation is not yet available (item 136 in FIG. 4). Note that on the right-hand side of FIG. 4, various buttons are provided to allow the user to pay one or more of the unpaid violation fines 134 or to provide a reminder 138 if, for example, the current violation is not yet available.

Figure 5:
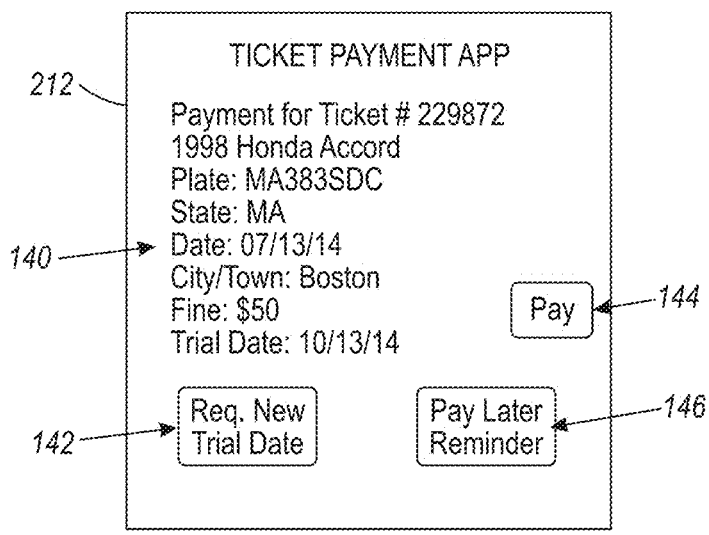
FIG. 5 is a schematic diagram of a screen provided on a graphic user interface using methods and systems herein.
Figure 6:
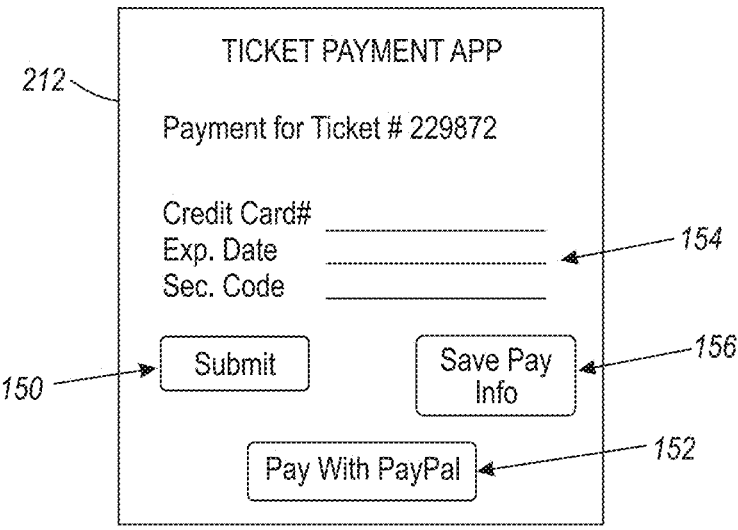
FIG. 6 is a schematic diagram of a screen provided on a graphic user interface using methods and systems herein.

If any of the payment buttons 134 are selected, the remote application provides a form of payment display, such as the example shown in FIG. 5 (although those skilled in the art would understand that many different forms of payment displays could be provided and that FIG. 5 is only one example). In the example shown in FIG. 5, the user has selected the pay button 134 next to the third violation 132 shown in FIG. 4.

Here, many details 140 of the violation retrieved from the violation database by the server application are displayed for the user so that the user can confirm that their vehicle was correctly cited for a violation (including, but not limited to, vehicle year, make, model, license plate number, license plates date, date, city/town, etc.). Additionally, as shown in FIG. 5 the amount of the fine and the trial date can be provided in item 140. While this information is shown as being provided in the exemplary screen shown in FIG. 5, this information could equally be provided in other screens illustrated in the drawings or in additional screens, depending upon available space, the look and feel desired by a specific application designer, etc., and the examples shown in the accompanying drawings are not intended to limit the way in which information can be provided to, or retrieved from the user, but instead are only provided as examples to show ways in which the methods and systems herein may operate.

Further, as shown in various buttons in FIG. 5, the user can be provided with an option to request a new trial date 142, to proceed with payment of the fine 144, or to set a reminder to pay at a later date 146. If the user desires to provide immediate payment by selecting the pay button 144 in FIG. 5, a more detailed payment screen can be provided, such as that shown in FIG. 6, which provides input fields for credit card information 154 (credit card number, expiration date, security code, etc.), to pay with a different online payment service 152 (e.g., electronic wallet, PayPal®, etc.), and other alternatives payment buttons could be provided. Button 150 allows the user to submit their payment information (if, for example, entered through the input fields 154). Also, button 156 provides the user with the option to save their payment information to their user preferences so that the next time they select the pay button (e.g. buttons 134, 144, etc.) all necessary fields can be automatically populated with such data.

Figure 7:
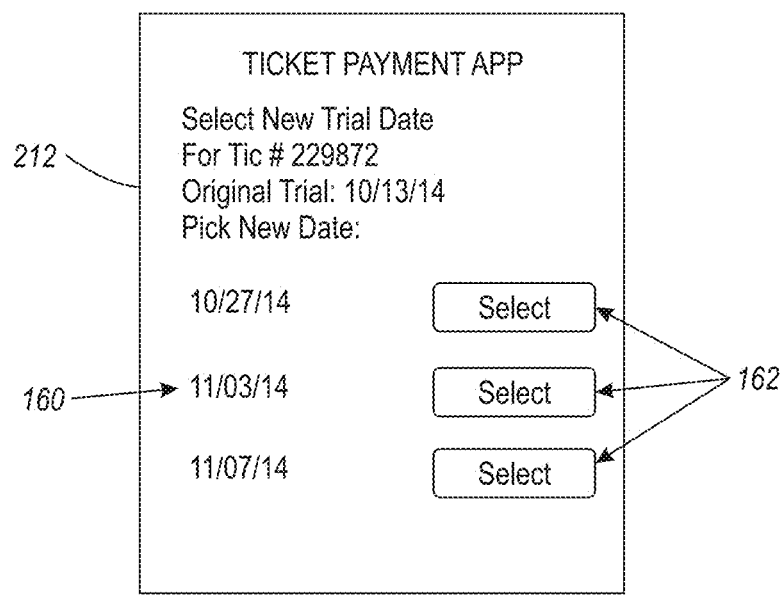
FIG. 7 is a schematic diagram of a screen provided on a graphic user interface using methods and systems herein.

If the user selects the menu option 142 to request a new trial date because they feel some aspect of the violation is incorrect but the current trial date is inconvenient, the remote application can request that the server application retrieve available additional trial dates to which a specific violation could be rescheduled from one or more databases (depending upon locale jurisdictional rules) and, as shown in FIG. 7, the remote application can provide a screen display on the graphic user interface 212 to allow the user to select a different trial date. Specifically, in FIG. 7, different dates are presented as shown by reference numeral 160 and the user is provided various selection buttons 162 for selecting one of these different trial dates. Any trial dates described herein can be automatically transferred to the user's calendar, depending upon user preferences for automatically setting dates on the user's calendar. Upon selection of a different trial date, the user can be provided a confirmation or other notification of the change in trial date.

Figure 8:
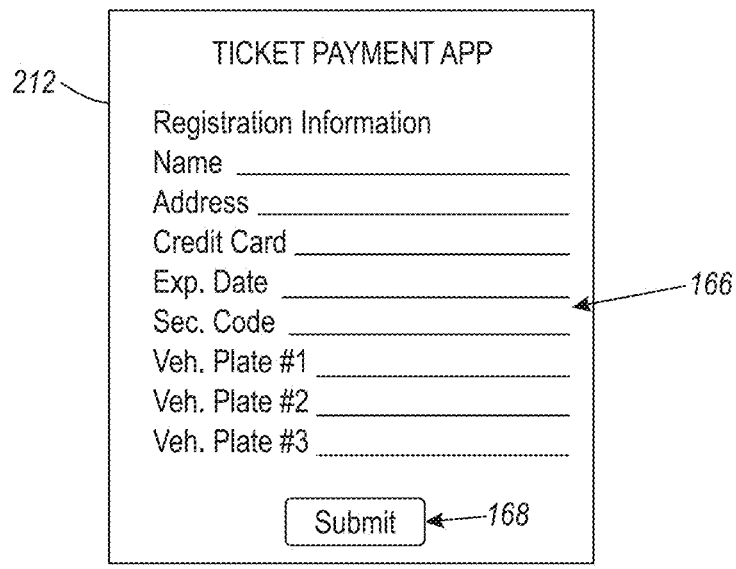
FIG. 8 is a schematic diagram of a screen provided on a graphic user interface using methods and systems herein.

As noted above, the user can register with the remote application to provide the remote application with specific user details, and one exemplary screen for obtaining some of such information is shown in FIG. 8. More specifically, the graphic user interface 212 in FIG. 8 provides various exemplary fields that can be completed by the user as shown by reference numeral 166 (such as name, address, credit card, expiration date, security code, vehicle license plate for different vehicles (vehicle 1, 2, 3, etc.)) and the user can select the submit button 168 when a sufficient number of fields 166 are completed. In addition, in a screen similar to that shown in FIG. 8, the user can be provided with a security code (or the user can create/enter their own a security code) in the user preferences, and such a security care can be entered by the user to grant access rights to the data within the database (in, for example, FIG. 3, discussed above). The remote application can maintain this information and can optionally share this information with the server application, depending upon implementation.

As is also noted above, the user is provided different options for setting reminders (such as, but not limited to, the reminder 138 in FIG. 4, if a current violation is not yet available, the reminder to pay a violation later 146 in FIG. 5, etc.). The user may establish various preferences (through a screen similar to that shown in FIG. 8) for automatically setting reminders. For example, the user may desire that a reminder be set automatically for the due date of any violation fine, that a reminder be automatically set for two weeks in the future, and such reminders can be automatically set, or can be set any time a reminder button 138, 146, etc., is selected.

Figure 9:
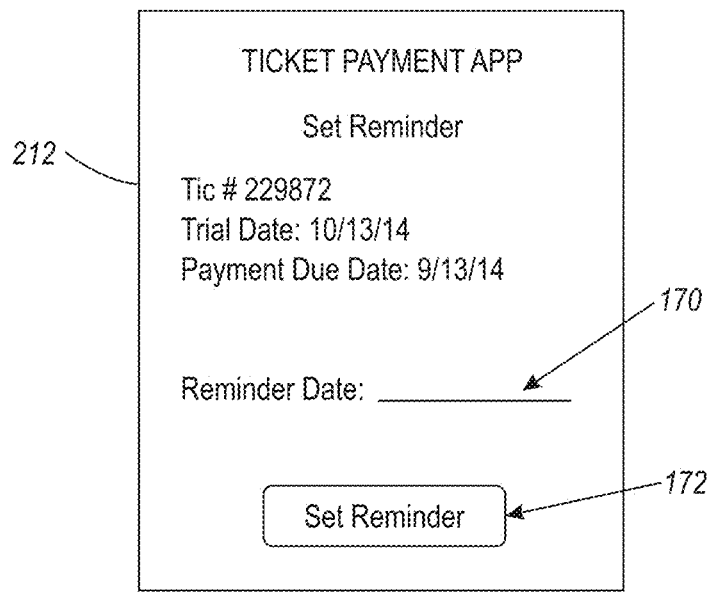
FIG. 9 is a schematic diagram of a screen provided on a graphic user interface using methods and systems herein.

Alternatively, as shown in FIG. 9, when a user selects a reminder button 138, 146, etc., a set reminder screen may be provided as shown in the graphic user interface 212 screen display in FIG. 9. Here, the user can manually enter a reminder date 170 (and potentially reminder time) and push the set reminder button 172. Additionally, depending upon user preferences established using screens similar to that shown in FIG. 8, the reminder date field 170 can be automatically populated (e.g., with a date that is same as the fine payment due date, a date that is two weeks in the future, etc.). The remote application and maintains a reminder system to provide a reminder alert when any reminder date occurs that has been established by a user.

Figure 10:
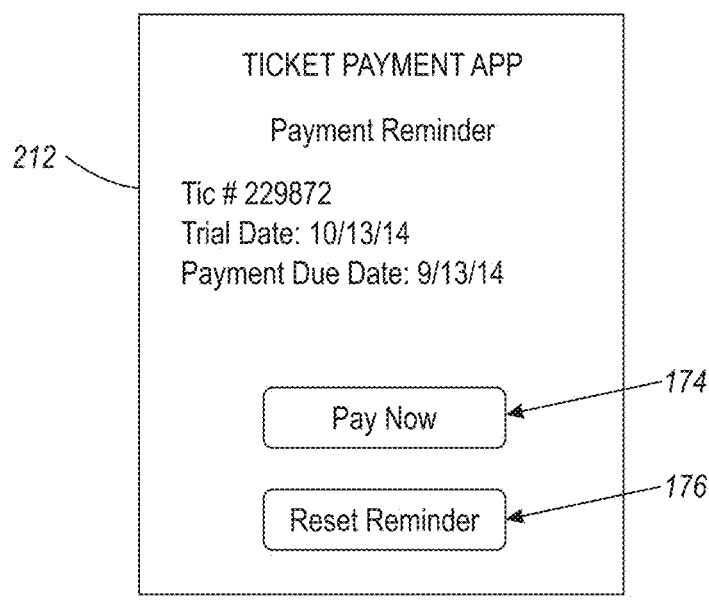
FIG. 10 is a schematic diagram of a screen provided on a graphic user interface using methods and systems herein.

For example, as shown in FIG. 10, a reminder alert can appear on the graphic user interface 212 when a reminder date (and potentially reminder time) occurs. In this example, the reminder information provided includes ticket number, the trial date, and the payment due date. A pay now button 174 and a reset reminder button 176 are provided in this exemplary screen display shown in FIG. 10. Selection of the pay now button 174 returns the user directly to a payment screen, such as that shown in FIG. 6, and selection of the set reminder button 176 returns the user directly to a set reminder screen, such as that shown in FIG. 9.

Figure 11:
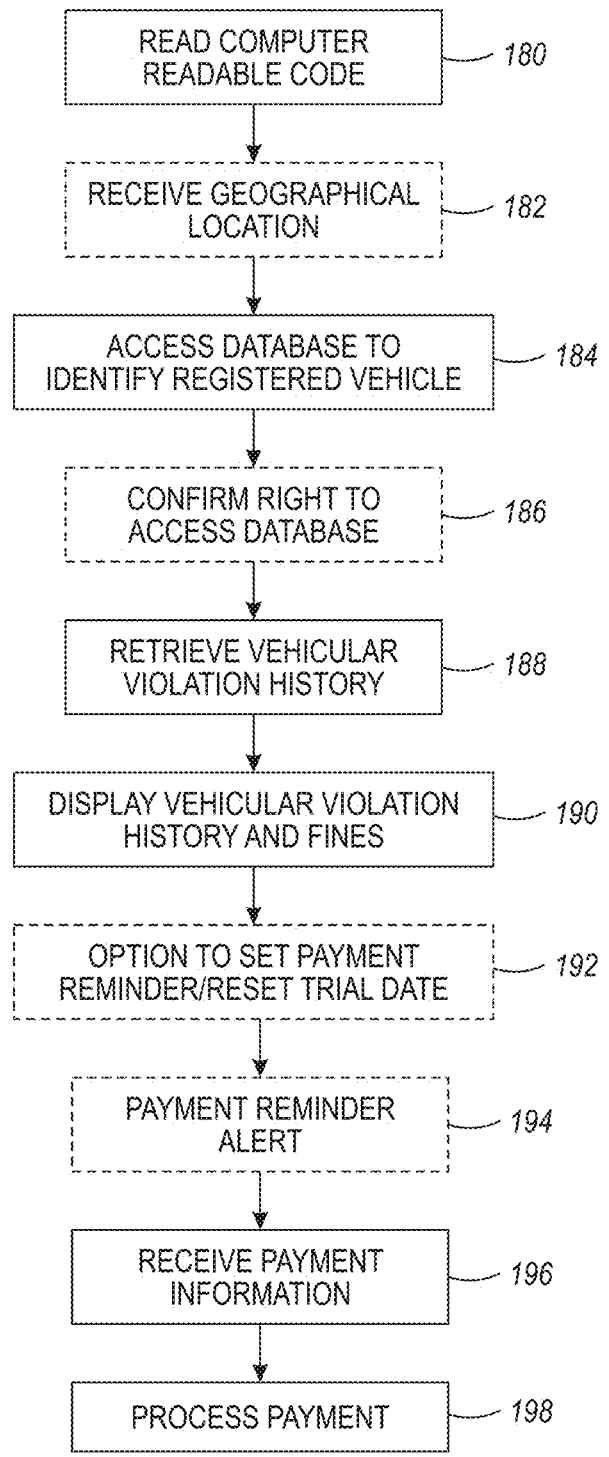
FIG. 11 is a flow diagram of various methods herein.

FIG. 11 is flowchart illustrating exemplary methods herein, where dashed boxes represent optional processing. In item 180, these exemplary methods read a computer readable code (e.g., a barcode, a glyph, a quick reference (QR) code, etc.) on a printed vehicular violation (e.g., parking ticket or other legal violation) using an optical sensor of a portable computing device (e.g., using a camera device of a portable computer, a tablet, and a smart phone, etc.). With this, the methods herein can access a vehicular violation database to identify a registered vehicle corresponding to data in the computer readable code in item 184.

To help locate the correct vehicular violation database, the methods herein can optionally receive a geographic location corresponding to where the printed vehicular violation was obtained by providing an input field for the geographic location on the graphic user interface of the portable computing device, as shown in item 182. This allows the methods herein to correctly access the vehicular violation database that is associated with the geographic location. In some instances, the user can be assisted in item 182 by the methods herein providing a current location on the graphic user interface (based on a global positioning system (GPS) device of the portable computing device) if the user is still in the locale where the violation was issued when they desire to pay the fine.

To maintain privacy rights, the methods herein can optionally confirm the right to access data in the vehicular violation database in item 186 by requesting and receiving data of the registered vehicle that would not be provided on the printed vehicular violation (e.g., through an input field on a graphic user interface of the portable computing device). Such data that is normally not provided on the printed vehicular violation can include the name of the owner of the registered vehicle, the owner's address, etc. Upon confirming the right to access the vehicular violation database by having the user provide information (that is in addition to that information provided on the printed vehicular violation) the methods herein retrieve a vehicular violation history for the registered vehicle (using the portable computing device) in item 188.

The vehicular violation history is a history of multiple (e.g., the most recent) vehicular violations maintained by the vehicular violation database related to the registered vehicle, and includes a payment status of fines associated with the different vehicular violations. The methods herein therefore display this vehicular violation history and display an option to pay one or more of the fines on the graphic user interface in item 190.

If the user does not wish to immediately pay any fines due, the methods herein can display an option on the graphic user interface to set a reminder to pay one or more of the fines at a future time and date and an option to reset the trial date in item 192. If the reminder option is chosen, these methods display an alert on the graphic user interface at the time and date corresponding to the reminder in item 194, and the alert provides an option to immediately perform the payment processing, to allow the user to jump directly to the payment screen for ultimate user convenience.

The methods herein then receive payment information into the graphic user interface (for payment of one or more of the fines) in item 196 and process the payment of one or more of the fines through the portable computing device in item 198, using the payment information provided.

As shown in FIG. 12, exemplary systems and methods herein include computerized devices 200, 204 located at various different physical locations 206. The computerized devices 200, 204 can include servers, portable devices, personal computers, etc., and are in communication (operatively connected to one another) by way of a locale or wide area (wired or wireless) network 202.

FIG. 13 illustrates a computerized device 200, which can be used with systems and methods herein and can comprise, for example, a server, a personal computer, a networked computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 232.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions (e.g., applications or apps) that the tangible processor 216 executes to allow the computerized device to perform its various functions, such as those described herein. Thus, as shown in FIG. 13, a body housing has one or more functional components that operate on power supplied from an alternating current (AC) source 220 by the power supply 218. The power supply 218 can comprise a common power conversion unit, power storage element (e.g., a battery, etc), etc.

FIG. 14 also illustrates a computerized device 204, such as a portable computerized device, which includes many of the components mentioned above in FIG. 13 (and similar items are provided the same reference numeral in the drawings). The portable computing device 204 shown in FIGS. 1, 12, and 14 can comprise, for example, a special-use device such as a smart phone, tablet, or other special-purpose portable computerized element that is easily carried by a user. Such devices are special-purpose devices distinguished from general-purpose computers because such devices include specialized hardware, such as: specialized processors 226 (e.g., containing specialized filters, buffers, application specific integrated circuits (ASICs), ports, etc.) that are specialized for phone communications, for use with cellular networks, etc.; specialized graphic user interfaces 212 (that are specialized for reduced power consumption, reduced size, antiglare, etc.); antenna 228 (that are specialized for phone communications, for use with cellular networks, etc.); specialized converters; GPS equipment 224; cameras and optical devices 222 (that are specialized for obtaining images with camera components); specialized batteries; specialized protective cases for use in harsh environments; etc.

Thus, as shown in the accompanying drawings, various systems herein include, among other components, a server application (stored on storage medium 210) operating on a computerized device 200 that maintains a vehicular violation database (also stored on storage medium 210), and a remote application (stored on storage medium 210) in communication with the server application and operating on a portable computing device 204 (that is operatively (meaning directly or indirectly) connected to the computerized device 200 over a network).

The remote application causes an optical sensor 222 of the portable computing device 204 to read a computer readable code on a printed vehicular violation. The server application accesses a vehicular violation database to identify a registered vehicle corresponding to data in the computer readable code. To help locate the correct vehicular violation database, the remote application can cause the portable computing device 204 to obtain a geographic location corresponding to where the printed vehicular violation was obtained by providing an input field for the geographic location on the graphic user interface of the portable computing device 204. This allows the remote application to correctly access the vehicular violation database that is associated with the geographic location. In some instances, the user can be assisted by the remote application causing the portable computing device 204 to provide a current location on the graphic user interface (based on a global positioning system (GPS) device 224 of the portable computing device 204) if the user is still in the locale where the violation was issued when they desire to pay the fine.

To maintain privacy rights, the remote application can confirm the right to access data in the vehicular violation database by having the remote application cause the portable computing device 204 to request and receive data of the registered vehicle that would not be provided on the printed vehicular violation (e.g., through an input field on a graphic user interface of the portable computing device 204). Such data that is normally not provided on the printed vehicular violation can include the name of the owner of the registered vehicle, the owner's address, etc. Upon confirming the right to access the vehicular violation database by having the user provide information that is in addition to that information provided on the printed vehicular violation, the server application retrieves a vehicular violation history for the registered vehicle.

The vehicular violation history is a history of all vehicular violations maintained by the vehicular violation database related to the registered vehicle, and includes a payment status of fines associated with the vehicular violations. The remote application causes the graphic user interface 212 of the portable computing device 204 to display the vehicular violation history and display an option to pay one or more of the fines. The remote application receives payment information through the graphic user interface 212 for payment of one or more of the fines. The server application processes the payment of one or more of the fines using the payment information.

Again, the remote application can causes the graphic user interface 212 to display an option to set a reminder to pay one or more of the fines at a future time and date. If so, the remote application then causes the graphic user interface 212 to display an alert at the time and date corresponding to the reminder. This alert provides an option to perform the processing the payment on the graphic user interface.

Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    reading a computer readable code on a printed vehicular violation using an optical sensor of a portable computing device;
    accessing a vehicular violation database operatively connected to said portable computing device to identify a registered vehicle corresponding to data in said computer readable code, using said portable computing device;
    before transferring a vehicular violation history from said vehicular violation database to said portable computing device, confirming a right to access said vehicular violation history by:
        displaying an input field requesting data of said registered vehicle not provided on said printed vehicular violation on a graphic user interface of said portable computing device;
        receiving said data of said registered vehicle not provided on said printed vehicular violation into said input field on said graphic user interface of said portable computing device; and
        verifying that said data of said registered vehicle not provided on said printed vehicular violation is correct to confirm said right to access said vehicular violation history;
    upon confirming said right to access, retrieving a vehicular violation history for said registered vehicle using said portable computing device, said vehicular violation history comprising a history of multiple vehicular violations maintained by said vehicular violation database related to said registered vehicle and a payment status of fines associated with said vehicular violations;
    displaying said vehicular violation history and displaying an option to pay one or more of said fines on a graphic user interface of said portable computing device;
    receiving payment information into said graphic user interface for payment of said one or more of said fines; and
    processing said payment of said one or more of said fines through said portable computing device using said payment information.

2. The method according to claim 1, further comprising displaying an option on said graphic user interface to set a reminder to pay said one or more of said fines at a future time and date.

3. The method according to claim 2, further comprising displaying an alert on said graphic user interface at a time and date corresponding to said reminder, said alert providing an option to perform said processing said payment on said graphic user interface.

4. The method according to claim 1, further comprising receiving a geographic location corresponding to where said printed vehicular violation was obtained into said portable computing device,
    said accessing said vehicular violation database comprising accessing a database associated with said geographic location.

5. The method according to claim 1, further comprising providing an option to change a trial date for said vehicular violations on said graphic user interface.

6. The method according to claim 1, said portable computing device comprising one of a portable computer, a tablet, and a smart phone, and
    said optical sensor comprising a camera device of said portable computing device.

7. The method according to claim 1, said computer readable code comprising one of a barcode, a glyph, and a quick reference (QR) code.

8. A method comprising:

reading a computer readable code on a printed vehicular violation using an optical sensor of a portable computing device;

accessing a vehicular violation database operatively connected to said portable computing device to identify a registered vehicle corresponding to data in said computer readable code, using said portable computing device;

before transferring a vehicular violation history from said vehicular violation database to said portable computing device, confirming a right to access data by receiving data of said registered vehicle not provided on said printed vehicular violation into an input field on a graphic user interface of said portable computing device;

upon confirming said right to access, retrieving a vehicular violation history for said registered vehicle using said portable computing device, said vehicular violation history comprising a history of multiple vehicular violations maintained by said vehicular violation database related to said registered vehicle and a payment status of fines associated with said vehicular violations;

displaying said vehicular violation history and displaying an option to pay one or more of said fines on said graphic user interface;

receiving payment information into said graphic user interface for payment of said one or more of said fines; and processing said payment of said one or more of said fines through said portable computing device using said payment information.

9. The method according to claim 8, further comprising displaying an option on said graphic user interface to set a reminder to pay said one or more of said fines at a future time and date.

10. The method according to claim 9, said data of said registered vehicle not provided on said printed vehicular violation comprising at least one of a name of an owner of said registered vehicle; and
an address of said owner.

11. The method according to claim 8, further comprising receiving a geographic location corresponding to where said printed vehicular violation was obtained into said portable computing device, said accessing said vehicular violation database comprising accessing a database associated with said geographic location.

12. The method according to claim 8, further comprising providing an option to change a trial date for said vehicular violations on said graphic user interface.

13. The method according to claim 8, said portable computing device comprising one of a portable computer, a tablet, and a smart phone, and said optical sensor comprising a camera device of said portable computing device.

14. The method according to claim 8, said computer readable code comprising one of a barcode, a glyph, and a quick reference (QR) code.

15. A system comprising:

a server application operating on a computerized device maintaining a vehicular violation database; and a remote application in communication with said server application and operating on a portable computing device operatively connected to said computerized device over a network, said remote application causing an optical sensor of said portable computing device to read a computer readable code on a printed vehicular violation, said server application accessing said vehicular violation database to identify a registered vehicle corresponding to data in said computer readable code, before transferring a vehicular violation history from said vehicular violation database to said portable computing device, said server application confirming a right to access said vehicular violation history by:

causing said remote application to display an input field requesting data of said registered vehicle not provided on said printed vehicular violation on a graphic user interface of said portable computing device and, in response to said display of said input filed, said remote application receiving said data of said registered vehicle not provided on said printed vehicular violation into said input field; and said server application verifying that said data of said registered vehicle not provided on said printed vehicular violation is correct to confirm said right to access said vehicular violation history;

upon confirming said right to access, said server application retrieving a vehicular violation history for said registered vehicle and transferring said vehicular violation history to said remote application, said vehicular violation history comprising a history of multiple vehicular violations maintained by said vehicular violation database related to said registered vehicle and a payment status of fines associated with said vehicular violations, said remote application causing a graphic user interface of said portable computing device to display said vehicular violation history and display an option to pay one or more of said fines, said remote application receiving payment information through said graphic user interface for payment of said one or more of said fines, and said server application processing said payment of said one or more of said fines using said payment information.

16. The system according to claim 15, said remote application causing said graphic user interface to display an option to set a reminder to pay said one or more of said fines at a future time and date.

17. The system according to claim 16, said remote application causing said graphic user interface to display an alert at a time and date corresponding to said reminder, said alert providing an option to perform said processing said payment on said graphic user interface.

18. The system according to claim 15, said remote application causing said graphic user interface to receive a geographic location corresponding to where said printed vehicular violation was obtained, said remote application accessing said vehicular violation database by accessing a database associated with said geographic location.

19. The system according to claim 15, said remote application causing said graphic user interface to provide an option to change a trial date for said vehicular violations.

20. The system according to claim 15, said computer readable code comprising one of a barcode, a glyph, and a quick reference (QR) code.

\* \* \* \* \*